United States Patent [19]

Vachon

[11] 3,892,924

[45] July 1, 1975

[54] ACTIVE HYBRID SIDETONE PRODUCING CIRCUITRY FOR SIDETONELESS TELEPHONE

[75] Inventor: Patrick Alban Vachon, Arvada, Colo.

[73] Assignee: Bell Telephone Laboratories, Incorporated, Murray Hill, N.J.

[22] Filed: Aug. 12, 1974

[21] Appl. No.: 496,696

[52] U.S. Cl. ..... 179/15 BY; 179/15 AA; 179/81 A; 179/170.8; 179/15 AD

[51] Int. Cl.[2] ........................................... H04J 3/00

[58] Field of Search ...... 179/15 BY, 15 AT, 15 AA, 179/81 A, 170.8, 15 AD

[56] References Cited

UNITED STATES PATENTS 3,825,693 7/1974 Smith ............................ 179/15 AT

*Primary Examiner*—Ralph D. Blakeslee

*Attorney, Agent, or Firm*—F. W. Padden

[57] ABSTRACT

A line circuit for a four-wire sidetoneless telephone is disclosed for use in a time division multiplex (TDM) communication system. The line circuit comprises circuitry for interfacing two-wire transmit and two-wire receive paths with transmit and receive operational amplifiers of a TDM active hybrid. Time division switches connect the amplifiers to respective transmit and receive TDM buses in time slots occurring in repetitive cycles and for exchanging communication signals on the buses. A sample/hold capacitor is arranged for storing a sample of a communication signal obtained from the receive bus via a time division switch. A resistor network couples an output signal from the transmit amplifier to an inverting input of the receive amplifier for cancelling a predetermined portion of the sampled signal applied to a noninverting input of the same amplifier from the sample/hold capacitor and for thereby providing a sidetone signal to the two-wire receive path.

5 Claims, 1 Drawing Figure

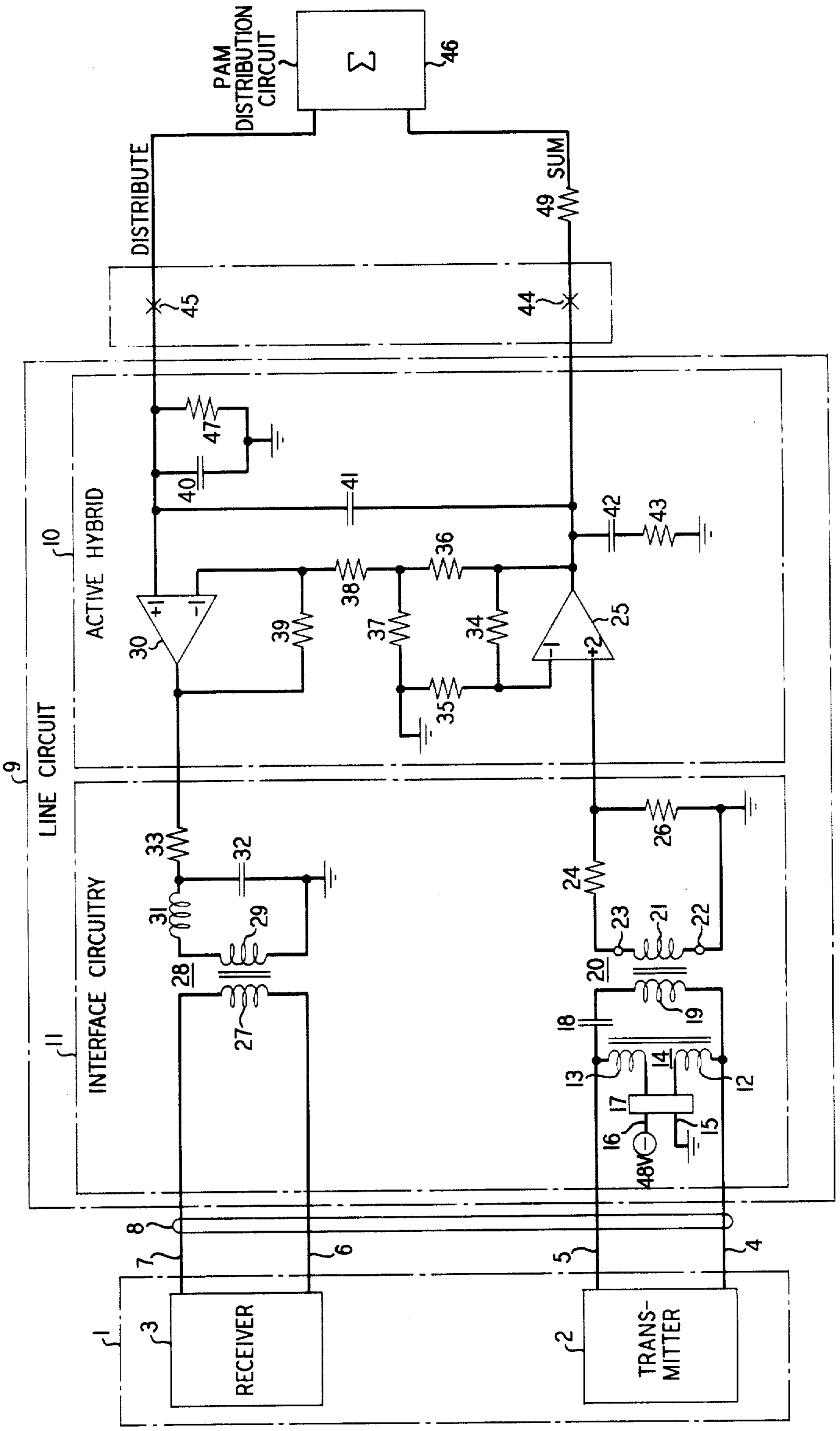
PAM DISTRIBUTION CIRCUIT
Σ
DISTRIBUTE
SUM
LINE CIRCUIT
ACTIVE HYBRID
INTERFACE CIRCUITRY
48V
RECEIVER
TRANS-MITTER

ACTIVE HYBRID SIDETONE PRODUCING CIRCUITRY FOR SIDETONELESS TELEPHONE

BACKGROUND OF THE INVENTION

This invention relates to communication systems and particularly to circuitry for producing controlled levels of sidetone signals for a communication station utilizing separate transmit and receive lines. The invention is specifically concerned with sidetone signal circuitry for active hybrid circuits illustratively serving four-wire lines in a time division multiplex (TDM) communication system.

In the communication arts, such as telephony, sidetone is known as the sound which is reproduced by a telephone receiver as a result of sound which enters the transmitter of the same telephone instrument. It typically occurs because the instrument has its transmitter and receiver serially connected with a single two-wire line. Sidetone does not occur, for example, in four-wire arrangements where the telephone transmitter and receiver do not share a common two-wire line, but instead are separately connected to individual two-wire lines.

From a human engineering standpoint, a certain degree of sidetone has proven to be beneficial for aiding a telephone user naturally to adjust his speech level for normal conversation. Experience has shown that, in an absence of sidetone, a telephone user has been prompted to speak too loudly. Contrastingly, an excessive sidetone has been found objectionable because, when a talker hears his own voice too loudly, he usually lowers his voice. Excessive sidetone also contributes to ear fatigue and an impairment of listening ability. It also causes local room noise to have a distractive effect on telephone conversation.

Since the introduction of the telephone having a separate transmitter and receiver connected over a single two-wire line, it has been a common practice to control the level of sidetone by electrical sidetone reduction or antisidetone networks. Such a network customarily utilizes the well known balanced transformer or hybrid principle and is embodied in each telephone station instrument.

A recognized problem in the prior art has been that simple and economical means have heretofore not been available for providing sidetone illustratively in four-wire equipment arrangements where the telephone transmitter and receiver are not connected to a shared two-wire line, but are separately connected to individual two-wire lines. As a result, the desirable benefits of sidetone achieved with the shared two-wire configurations have not heretofore been readily obtainable in four-wire telephone applications without, by way of example, relatively complex and costly additional four-wire to two-wire conversion devices and, of course, the antisidetone network in the telephone itself.

SUMMARY OF THE INVENTION

A solution to the foregoing problem is provided in accordance with a specific exemplary embodiment of my invention in which circuitry is included in a time division active hybrid circuit for furnishing controlled levels of sidetone. The hybrid circuit is a sample and hold arrangement equipped for conveying telephone call signals over individual transmit and receive channels for TDM processing and for call communication with a telephone station over four-wires comprising a portion of the separate transmit and receive channels. Advantageously, my circuitry is economical because it eliminates the need for an antisidetone network in the telephone station instrument and an additional four-wire to two-wire conversion device heretofore required in the prior art for interfacing with a two-wire telephone. My circuitry is simple inasmuch as it illustratively comprises a resistor pad network connected between hybrid transmit and receive operational amplifiers for balancing the magnitude of the sidetone produced for the four-wire telephone.

Each of the operational amplifiers includes a single output together with inverting and noninverting inputs. To provide sidetone according to my illustrative invention, a resistor pad configuration is connected from the output of the transmit amplifier to the inverting input of the receive amplifier to provide a controlled level of feedback for cancellation of a portion of the transmit signal appearing after TDM processing at the noninverting input of the receive amplifier. Controlled signal cancellation is required to preclude a signal transmitted from the telephone line over the TDM transmit channel and the TDM system to the hybrid receive channel from undesirably either being returned to the transmitting telephone at too high a level (excessive sidetone) or being completely cancelled (absence of sidetone).

It is a feature of my invention that the resistor pad network provides for controlled sidetone and direct current (DC) biasing of the inverting inputs of the receive and transmit amplifiers. The resistor pad includes a T pad between the output of the transmit amplifier and the inverting input of the receive amplifier. A portion of the T pad furnishes DC bias and gain control for the inverting input of the receive amplifier.

FEATURES

In view of the foregoing, it is a feature of my invention that a hybrid circuit is provided for use in a time division communication system to furnish a controlled level of sidetone signal to an output path for connecting signals supplied to a separate input path and for use in a time division communication system in which a telephone has a sidetoneless circuit configuration with its transmitter connected to the input path independently of its receiver which is connected to its output path. The hybrid circuit comprises a transmit and receive amplifier, each of which has input means and output means, means coupling the input means of the transmit amplifier to the input path, means for connecting a transmit amplifier output means via a time division switch to a time division transmit bus, means for connecting the input means of the receive amplifier to means for storing a sample of a communication signal received via a time division switch from a time division receive bus during a distinct time slot occurring in repetitive cycles, means connecting the receive amplifier output means to the output path, and impedance means coupling the output means of the transmit amplifier to the input means of the receive amplifier for controlling a transmission of a sidetone signal from the input path through the receive amplifier to the output path.

DESCRIPTION OF THE DRAWING

The invention, together with its various objects and features, can be readily understood from the following more detailed description of a specific illustrative embodiment thereof read in conjunction with the accompanying single sheet of schematic and block diagram of an exemplary TDM active hybrid circuit as part of a TDM system serving a four-wire telephone station.

DETAILED DESCRIPTION

In the drawing, there are shown a hybridless four-wire telephone 1 having a transmitter 2 and receiver 3 connected over separate two-wire tip and ring lead 4-7 of telephone line 8 and a line circuit 9 to sum (send) and distribute (receive) buses shared on a TDM basis by all line circuits and other functional service circuits (not shown) of the system. Line circuit 9 comprises two fundamental building blocks, namely, an active hybrid 10 and interface circuitry 11 coupling the hybrid 10 to the telephone line 8.

Interface circuitry 11 is equipped to supply operating −48 volts and ground potential to telphone 1 via tip and ring lead 4 and 5 of line 8, windings 12 and 13 of inductor 14, and lower and upper windings 15 and 16 of a line relay 17. Windings 12 and 13 of inductor 14 provide a low resistance path for direct current (DC) and a relatively high impedance for frequencies above a few hertz. A capacitor 18 is serially connected with lead 5, a first winding 19 of an audio transformer 20 to lead 4 for blocking the DC supplied to telephone 1 from also flowing through winding 19. Such DC current flow through the transformer windings, even at very low levels, can cause core saturation and undesired degradation of transmission quality. Transformer 20 also furnishes protection to the electronic components of hybrid 10 against hazards to which the tip and ring leads are occasionally subject, such as lightning strikes and power line crosses.

A second winding 21 of transformer 20 has one of its terminals 22 connected to ground and another terminal 23 connected in series with a resistor 24 to a noninverting +input of a transmit amplifier 25 of the hybrid 10. The +input of amplifier 25 is also connected through a voltage divider resistor 26 to ground.

Telephone 1 has its receiver 3 connected via separate leads 6 and 7 to a first winding 27 of a transformer 28. A second winding 29 of transformer 28 is advantageously connected to an output of a receive amplifier 30 of hybrid 10 via an electrical network comprising an inductor 31, capacitor 32 and a resistor 33. The value of latter resistor is for matching the impedance of the receiver 3 termination on leads 6 and 7. The filter network attenuates out-of-band energy incoming to leads 6 and 7 for minimizing crosstalk.

Hybrid 10 provides communication signal sampling, storage and transfer for the separate input and output path conductors 4, 5, and 6, 7 via the interface circuitry 11 and, advantageously to and from the separate one-way sum and distribute buses under TDM switching control. It comprises transmit and receive operational amplifiers 25 and 30, a pad of gain controlling resistors 34-39 between the amplifiers, a sample/hold capacitor 40, a sample/hold compensating capacitor 41, and a transmit pulse current supply capacitor 42 and resistor 43.

Each of the amplifiers 25 and 30 comprises inverting and noninverting inputs − and +, and a single output. The gain of signals at the +input of amplifier 25 is controlled by the resistors 34 and 35. Similarly, the gain of signals at the + and − inputs of amplifier 30 is controlled by resistor 39 and the T pad of resistors 36-38. Importantly, in accordance with my invention, the resistors 36-39 control the magnitude of transmit signal cancellation and, hence, the amount of transmit signal supplied as sidetone to the receive tip and ring leads 6 and 7 from the distribute bus.

Line circuit 9 is equipped with time division switches 44 and 45 for concurrently connecting the output of the transmit amplifier 25 and the +input of the receive amplifier 30 to the respective sum and distribute buses extending to the PAM distribution circuit 46 and during a time slot of a TDM frame selectively assigned by the TDM control equipment (not shown). At the output of amplifier 25, a resistor 43 and capacitor 42 are utilized to supply initial pulse current through a matching resistor 49 to the sum bus at the instant that the switch 44 is closed. The initial pulse current is required because of the amplifier 25 initial inability to build up pulse current for sampling the signal transmitted via amplifier 25 from transmit leads 4 and 5. Resistor 43 is in series with capacitor 42 for guarding against noise and crosstalk and, particularly, for providing sufficient damping to prevent the TDM pulse sampling transients from causing high noise crosstalk transients on the system ground.

PAM distribution circuit 46, in a manner known in the art, sums all of the signal samples in the TDM time slots appearing on the sum bus and concurrently supplies them to the distribute bus for application through closed switches, such as switch 45, to respective sample/hold capacitors, such as capacitor 40. For transmission quality, a resistor 47 is bridged across capacitor 40 and, specifically, to limit undesired voltage build-up across it due to leakage in switch 45 and biasing of amplifier 30. Capacitor 40 stores for an entire TDM sampling frame, the sample signal supplied to the distribute bus and, resultingly, such storage effects a reconstruction of the sampled waveform into a staircase signal in a known manner. Hybrid 10 further includes the capacitor 41 connected between switches 44 and 45 on the amplifier sides thereof for forming a capacitor divider with capacitor 40 and to maintain a desired degree of hybrid balance throughout the sample frame rather than solely during instants of time slot signal sampling.

Thus, hybrid 10 utilizes separate transmitreceive paths to and from the telephone line 8 and separate sum (transmit) and distribute (receive) paths for TDM communication. Since the telephone 1 is not equipped with hybrid, or an antisidetone network, it is important that a portion of transmitted signals be returned from the distribute bus to the receive output path via the receive amplifier 30 and coupling facilities of the interface circuitry 11. To achieve these functions, hybrid 10 requires the magnitude of the transmitted signal coupled to the inverting −input of amplifier 30 is advantageously controllably less than the magnitude of the transmitted signal appearing at the noninverting +input of amplifier 30 as a result of TDM transmission from amplifier 25 via switch 44, the sum bus, PAM distribution circuit 46, distribute bus, and switch 45. The latter is accomplished in part by feedback from the output of the transmit amplifier 25 through resistors 36, 37, and 38 to the inverting −input of amplifier 31 for cancelling only a portion of transmitted communication signals on the distribute bus from appearing at the output of amplifier 30.

To further illustrate how a sidetone signal is returned to telephone 1 without the need for antisidetone networks in the phone itself, assume that a voltage $V_S$ is present across the tip and ring lead 4 and 5 and that it appears as approximately $V_S/2$ at the +input to the transmit amplifier 25. Under these conditions, voltage $V_S$ appears at the output of amplifier 25. The voltage $V_S$ is summed during an assigned time slot through the PAM distribution circuit 46 and appears at the +input of amplifier 30.

In accordance with my invention, the voltage $V_S$ appearing at the output of amplifier 25 is divided among the T pad resistors 36, 37 and 38 and controllably causes a voltage less than $V_S$ to be applied to the inverting −input of amplifier 30 for effectively cancelling a portion of the voltage $V_S$ at the +input of amplifier 30. Thus, the uncancelled portion of the voltage $V_S$ for the transmitted signal appears at the output of amplifier 30 and is coupled via inductor 31 and transformer 28 to receive leads 6 and 7 as a sidetone signal for telephone 1.

By way of illustration, the following resistor, capacitor, and inductor component values have been found to be suitable for use in the illustrative line circuit.

TABLE OF COMPONENT VALUES

| Component | Value |
|---|---|
| 18 | 4.0 μf |
| 24 | 178 Ohms |
| 26 | 215 Ohms |
| 32 | 0.1 μf |
| 33 | 383 Ohms |
| 34 | 1400 Ohms |
| 35 | 511 Ohms |
| 36 | 2610 Ohms |
| 37 | 2870 Ohms |
| 38 | 2050 Ohms |
| 39 | 2260 Ohms |
| 40 | 560 pF |
| 41 | 470 pF |
| 42 | 0.1 μf |
| 43 | 4.64 Ohms |
| 47 | 1 Megohm |
| 49 | 374 Ohms |

It is to be understood that the hereinbefore described arrangements are illustrative of the application of principles of my invention. In light of this teaching, it is apparent that numerous other arrangements may be devised by those skilled in the art without departing from the spirit and scope of my invention.

What is claimed is:

1. A hybrid circuit for use in a time division communication system to provide a controlled level of sidetone signal to an output path for communication signals supplied to a separate input path and for use in a time division communication system in which a telephone has a sidetoneless circuit configuration with its transmitter connected to said input path independently of its receiver which is connected to said output path, comprising a transmit amplifier having input means and output means and a receive amplifier having first and second inputs and an output means, means coupling said input means of said transmit amplifier to said input path, means for connecting said transmit amplifier output means via a time division switch to a time division transmit bus, connector means for connecting said first input of said receive amplifier to means for storing a sample of a communication signal received via a time division switch from a time division receive bus during a distinct time slot occurring in repetitive cycles, means connecting said receive amplifier output means to said output path, and impedance means coupling said output means of said transmit amplifier to said second input of said receive amplifier for controlling a transmission of a sidetone signal from said input path through said receive amplifier to said output path.

2. A hybrid circuit according to claim 1 wherein said impedance means comprises a resistor pad network.

3. A hybrid circuit according to claim 2 wherein said resistor pad network includes a T-pad providing direct current bias for said second input of said receive amplifier and nonfrequency dependent sidetone signal controlling feedback from said transmit amplifier output means to said second input of said receive amplifier.

4. In a time division communication system in which a plurality of time slots occur in repetitive cycles for communication and comprising, a plurality of communication lines, each of said lines including a transmit path and a separate receive path, an outgoing time division bus;

an incoming time division bus;

means for exchanging signals among a plurality of selected ones of said communication lines and including means interconnecting said outgoing and incoming buses, a plurality of line circuits, each of said circuits individually connected to the transmit and receive paths of one of said lines, and time division switch means for selectively connecting said transmit and receive paths to said outgoing and incoming buses during said time slots;

each of said circuits comprising a transmit and a receive amplifier each having first and second inputs and an output, means coupling said first input of said transmit amplifier to an individual one of said transmit paths, electrical biasing means connected to said second input of said transmit amplifier, means connecting said output of said transmit amplifier to said switch means, means connected to said switch means for storing a sample of a communication signal received from said incoming bus during a distinct one of said time slots, said first input of said receive amplifier connected to said storing means, means for coupling said output of said receive amplifier to an individual one of said receive paths, and impedance means coupling said output of said transmit amplifier to said second input of said receive amplifier for controlling a transmission of a sidetone signal from said individual one of said transmit paths through said receive amplifier to said individual one of said receive paths.

5. In a time division communication system according to claim 4, the combination wherein said impedance means comprises a resistor network connected to said second input of said receive amplifier for controlling the level of said sidetone signal transmission to said individual one of said receive paths.

* * * * *